(12) United States Patent
Lang

(10) Patent No.: US 9,653,954 B2
(45) Date of Patent: May 16, 2017

(54) ELECTRIC MACHINE ROTOR WITH ROTOR VENT AND AXIAL SLOT FLUID COMMUNICATION

(71) Applicant: Nicholas G. Lang, Cincinnati, OH (US)

(72) Inventor: Nicholas G. Lang, Cincinnati, OH (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 465 days.

(21) Appl. No.: 14/030,089

(22) Filed: Sep. 18, 2013

(65) Prior Publication Data
US 2015/0076968 A1   Mar. 19, 2015

(51) Int. Cl.
*H02K 1/32* (2006.01)
*H02K 3/24* (2006.01)
*H02K 17/16* (2006.01)

(52) U.S. Cl.
CPC .............. *H02K 1/32* (2013.01); *H02K 3/24* (2013.01); *H02K 17/165* (2013.01)

(58) Field of Classification Search
CPC .......... H02K 1/32; H02K 2/24; H02K 17/165; H02K 9/02; H02K 1/20; H02K 1/325; H02K 17/16; H02K 17/18; H02K 17/20; H02K 17/185
USPC ......... 310/60 A, 61, 65, 52, 64, 59, 58, 211, 310/212
See application file for complete search history.

(56) References Cited

U.S. PATENT DOCUMENTS

| | | | | |
|---|---|---|---|---|
| 1,708,909 A * | 4/1929 | Spencer | ............... | H02K 17/185 310/212 |
| 2,176,871 A * | 10/1939 | Harrell | ............... | H02K 15/0012 164/DIG. 10 |
| 2,370,458 A * | 2/1945 | Goran | ................ | H02K 15/0012 164/DIG. 10 |
| 2,956,186 A * | 10/1960 | Wall | ......................... | H02K 1/32 310/211 |
| 3,832,583 A * | 8/1974 | Chang | ....................... | H02K 3/48 310/201 |
| 4,311,932 A * | 1/1982 | Olson | ...................... | H02K 9/19 310/59 |
| 4,331,895 A * | 5/1982 | Edick | ................. | B22D 19/0054 310/211 |
| 4,362,959 A * | 12/1982 | Bartheld | ................. | H02K 17/16 310/211 |
| 5,191,250 A * | 3/1993 | Kobayashi | ............. | H02K 1/265 310/198 |
| 5,866,959 A * | 2/1999 | Le Flem | .................. | H02K 1/20 310/187 |
| 7,411,323 B2 * | 8/2008 | Pfannschmidt | .......... | H02K 1/20 310/58 |
| 7,893,577 B2 * | 2/2011 | Binder | ...................... | H02K 1/32 310/216.004 |
| 2011/0140565 A1 * | 6/2011 | Yabe | .................... | H02K 17/205 310/211 |
| 2014/0042841 A1 * | 2/2014 | Rippel | ..................... | H02K 1/20 310/54 |

* cited by examiner

*Primary Examiner* — Burton Mullins

(57) ABSTRACT

A rotor of an electric machine is provided and includes first and second core elements formed to define annular arrays of axial slots and rotor bar openings, each axial slot being fluidly communicative with a corresponding one of the rotor bar openings and a spacer element interposed between the first and second core elements to define a rotor vent opening fluidly communicative with the axial slots.

14 Claims, 4 Drawing Sheets

ELECTRIC MACHINE ROTOR WITH ROTOR VENT AND AXIAL SLOT FLUID COMMUNICATION

BACKGROUND OF THE INVENTION

The subject matter disclosed herein relates to an electric machine and, more particularly, to an electric machine rotor with rotor vent and axial slot fluid communication.

In electric machines, a stator is normally formed to define a bore in which a rotor is rotatably supported. The stator includes conductive elements provided as stator windings. The rotor includes a squirrel cage or an amortisseur winding such that rotation of the rotor within the bore while an excitation current is applied to the stator windings can generate current in the conductive elements, which are disposed to extend through the stator when the electric machine is run in a generator mode. By contrast, current applied to such conductive elements can interact with the squirrel cage or amortisseur winding and thereby cause the rotor to rotate in a motor mode.

During operation of the electric machine in either the generator or motor mode, a large amount of heat can be generated in various elements. This heat can lead to damage to motor components, the stator or the rotor but primarily to stator winding insulation if the heat is not removed or the heated elements are not otherwise cooled. One way to remove heat and to cool the various elements in an electric machine is to form cooling paths through the stator and/or the rotor by which coolant, such as ambient air, is directed through or across heat generating parts, such as the conductive elements. Cooling path formation can be difficult, however, because it can often lead to negative magnetic circuit impacts, which reduce the performance of the electric machine. Therefore, placement, sizing and selection of geometry of the cooling paths is of utmost importance.

BRIEF DESCRIPTION OF THE INVENTION

According to one aspect of the invention, a rotor of an electric machine is provided and includes first and second core elements formed to define annular arrays of axial slots and rotor bar openings, each axial slot being fluidly communicative with a corresponding one of the rotor bar openings and a spacer element interposed between the first and second core elements to define a rotor vent opening fluidly communicative with the axial slots.

According to another aspect of the invention, a rotor of an electric machine is provided and includes laminations bonded to form first and second core elements, each of the first and second core elements including an annular array of teeth defining annular arrays of axial slots and rotor bar openings, each axial slot being fluidly communicative with a corresponding one of the rotor bar openings, and each rotor bar opening being configured to retain a rotor bar therein, and a spacer element interposed between the first and second core elements to define a rotor vent opening fluidly communicative with the axial slots.

According to yet another aspect of the invention, an electric machine is provided and includes a rotor and a stator defining a bore in which the rotor is rotatably supportable. The rotor includes laminations bonded to form first and second core elements. Each of the first and second core elements includes an annular array of teeth defining annular arrays of axial slots and rotor bar openings. Each axial slot is fluidly communicative with a corresponding one of the rotor bar openings. The rotor further includes a spacer element interposed between the first and second core elements to define a rotor vent opening fluidly communicative with the axial slots and an annular array of rotor bars. Each rotor bar is retained in a corresponding one of the rotor bar openings.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

An electric machine is provided and includes rotor vent openings, axial slots and rotor bar openings that are combined or fluidly communicative with one another. This leads to increased airflow to the rotor bars, which may be exposed to coolant over their entire longitudinal length, with reduced magnetic circuit impact. In addition, since the axial slots and the rotor bar openings are combined or fluidly communicative, manufacturing effort may be reduced for the electric machine since the axial slots and the rotor bar openings can be punched in one operation instead of two operations.

Figure 1:
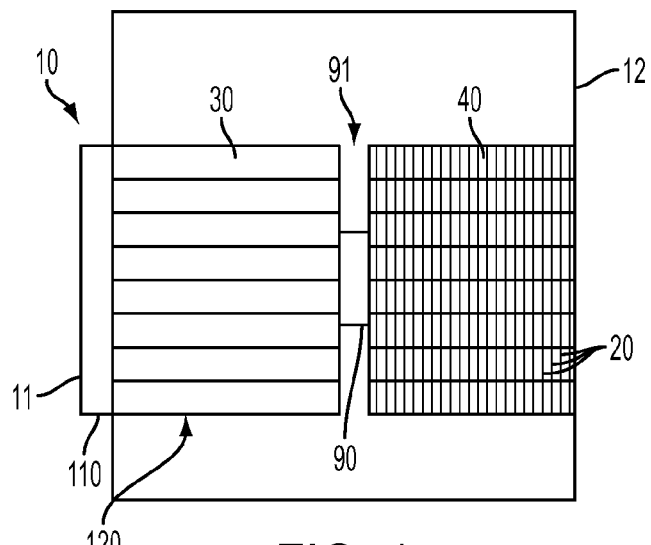
FIG. 1 is a radial view of an electric machine in accordance with embodiments.

With reference to FIG. 1, an electric machine 10 is provided and configured to operate in a generator mode or a motor mode. The electric machine 10 includes a rotor 11 and a stator 12. The stator 12 includes a stator winding and is formed to define a bore 120 in which the rotor 11 is rotatably supportable. The rotor 11 may be provided with a squirrel cage or amortisseur winding. With this configuration, the stator winding can generate flux, which induces current in conductive elements (e.g., rotor bars 100 to be described below), which are disposed to extend through the rotor 11.

The rotor 11 is formed of a plurality of laminations 20 that are stacked between end plates. The end plates are used to compress the laminations 20 and to provide support to end turns of the conductive elements. Each lamination 20 is formed from a relatively thin piece of sheet metal that is punched, stamped or otherwise cut into shape and then consolidated with at least one or two adjacent and substantially similarly shaped and sized laminations 20. The consolidation is performed in accordance with various known methods. The stator 12 may be similarly formed of a plurality of laminations.

Figure 3:
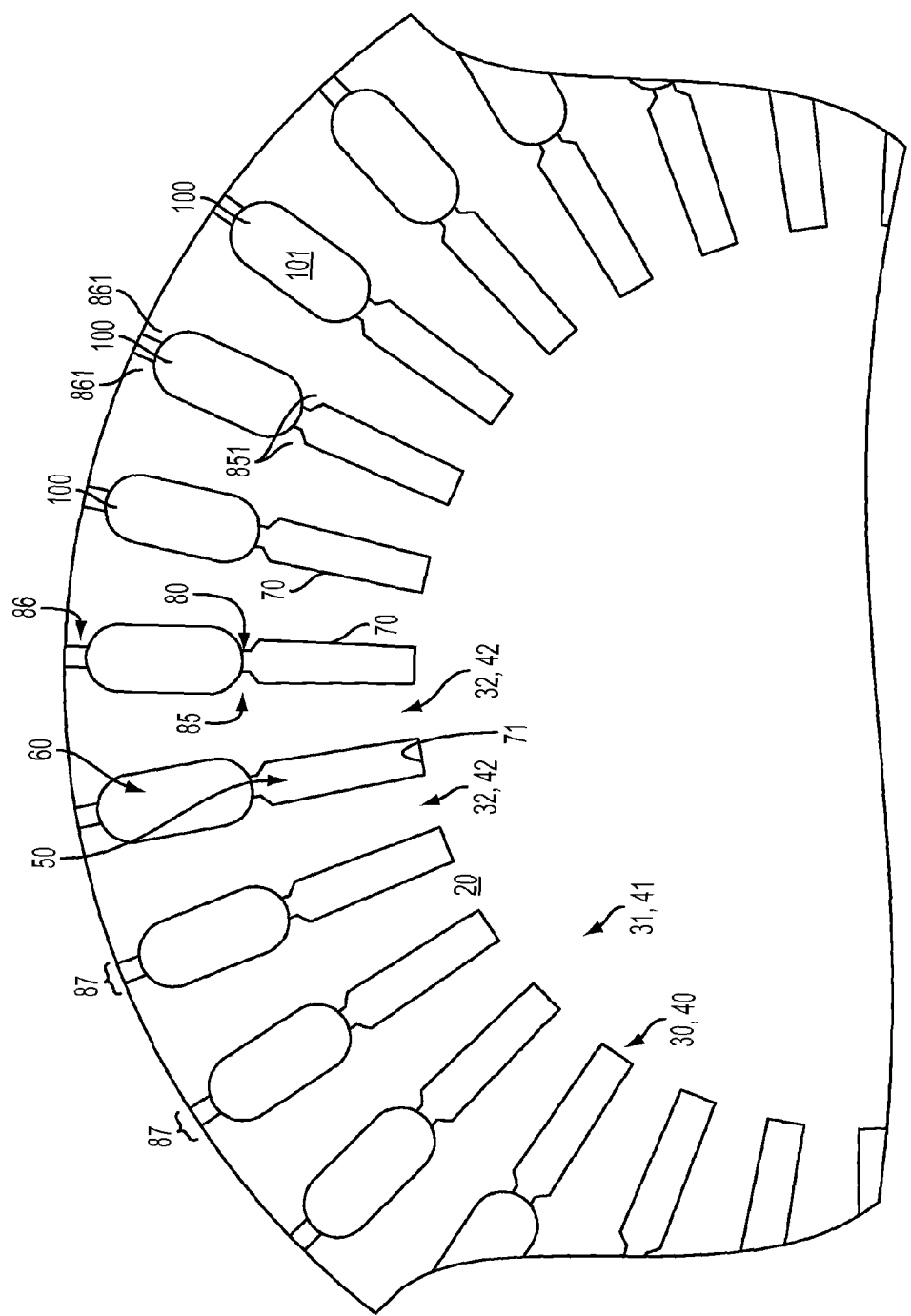
FIG. 3 is an axial view of a portion of a lamination and rotor bars of the electric machine of FIG. 1.

With enough laminations 20 consolidated together, the laminations 20 may form at least a first core element 30 and a second core element 40. With reference to FIG. 3, each of the laminations 20 is formed such that the first and second core elements 30 and 40 each includes an annular or cylindrical hub portion 31, 41 and an annular array of teeth 32, 43. The teeth 32, 42 extend radially outwardly from the hub portions 31, 41 and thus define annular arrays of axial slots 50 and rotor bar openings 60.

More particularly, the laminations 20 are formed such that the teeth 32, 42 of each sequential pair include respective interior radial surfaces 70 that are conjoined at radially interior ends thereof with an exterior facing circumferential surface 71 of the hub portions 31, 41. The interior radial surfaces 70 and the circumferential surface 71 thus cooperatively define a single axial slot 50, which is proximate to the exterior circumferential surface 71, and a single rotor bar opening 60, which is remote from the exterior circumferential surface 71. That is, the single rotor bar opening 60 between each sequential pair of teeth 32, 42 is defined radially outwardly from the single axial slot 50 defined between the sequential pair of teeth 32, 42.

With the laminations 20 bonded to form the first and second core elements 30 and 40, each of the axial slots 50 and each of the rotor bar openings 60 extend along a longitudinal length of the rotor 11. In addition, as will be discussed below, each axial slot 50 is fluidly communicative with a corresponding one of the rotor bar openings 60 via pathways 80 defined by the laminations 20. The fluid communication between the axial slots 50 and the corresponding rotor bar openings 60 effectively define a single flow area that can be formed when the laminations 20 are initially formed in a single one-punch operation. A size of this single flow area is determined to limit pressure losses.

The laminations 20 are formed such that the first and second core elements 30 and 40 include inner diameter (ID) retention elements 85 (see FIG. 3), which are configured to provide for ID rotor bar retention, and outer diameter (OD) retention elements 86 (see FIG. 2), which are configured to provide for OD rotor bar retention. As shown in FIG. 3, to form the ID retention elements 85, the laminations 20 include partial opposite flanges 851 that protrude toward one another from the respective interior radial surfaces 70 in the circumferential dimension but do not meet. The partial opposite flanges 851 are located at complementary ends of the corresponding axial slot 50 and the corresponding rotor bar opening 60 (i.e., the radially outward end of the axial slot 50 and the radially inward end of the rotor bar opening 60) and the fact that they do not meet allows the partial opposite flanges 851 to provide for the above-noted fluid communication via the pathways 80. That is, the partial opposite flanges 851 define the pathways 80.

Figure 2:
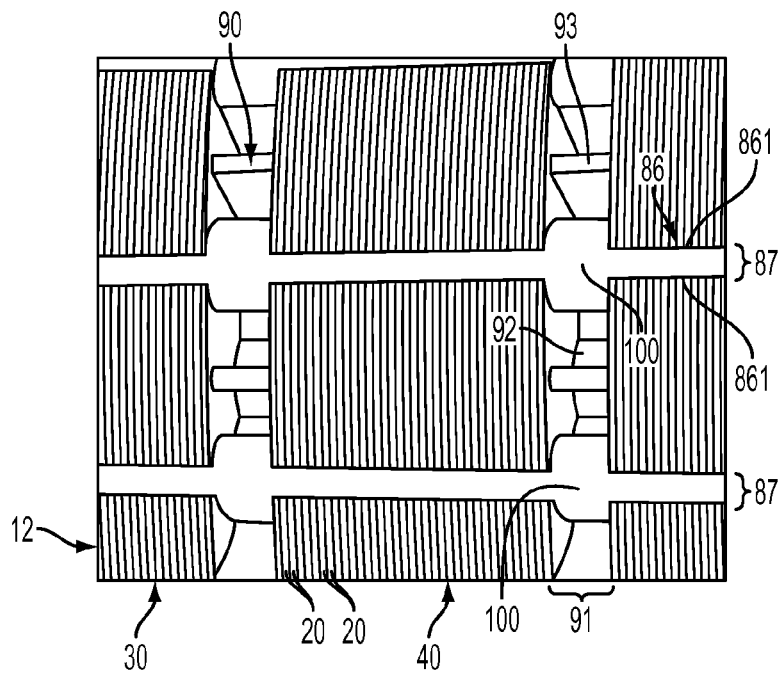
FIG. 2 is a radial view of a rotor of the electric machine of FIG. 1 in accordance with embodiments.

As shown in FIG. 2, to form the OD retention elements 86, the laminations 20 include partial opposite flanges 861 (see FIGS. 2 and 3) that protrude toward one another from the respective interior radial surfaces 70 in the circumferential dimension but, again, do not meet. The partial opposite flanges 861 are located at exterior or radially outward ends of the corresponding rotor bar opening 60 and the fact that they do not meet provides for fluid communication between the corresponding rotor bar opening 60 and an exterior of the rotor 11. That is, the partial opposite flanges 861 define a leakage notch 87 (see FIG. 2).

Although not shown in FIG. 2, it will be understood from the illustration in FIG. 3 that the partial opposite flanges 861 may have a radial depth such that the leakage notches 87 extend radially outwardly from outermost portions of the corresponding rotor bar openings 60.

With reference to FIGS. 1-4, the rotor 11 further includes a spacer element 90 (see FIGS. 2 and 4), an annular array of rotor bars 100 (see FIGS. 3 and 4) and a shorting ring 110 (see FIG. 1). The spacer element 90 may be axially interposed between the first and second core elements 20 and 30. In this position, the spacer element 90 is formed to define a rotor vent opening 91 (see FIG. 2) that is fluidly communicative with at least the rotor bar openings 60 and the axial slots 50. The annular array of rotor bars 100 includes multiple individual rotor bars 100 that are formed of electrically conductive material, such as a metallic material or, more particularly, copper.

The rotor bars 100 have bodies 101 (see FIGS. 3 and 4) with cross-sections that may be elliptical or ovular (or otherwise constructed in known configurations) and elongate in the radial dimension (with respect to the rotor 11). The rotor bars 100 are removably insertable into the rotor bar openings 60, which are respectively configured to retain the corresponding rotor bars 100 therein in inward and outward radial directions as described above. More particularly, the radially interior surfaces of the rotor bars 100 impinge and rest upon the partial opposite flanges 851 for the ID rotor bar retention and the partial opposite flanges 861 impinge or rest upon the radially exterior surfaces of the rotor bars 100 for the OD rotor bar retention. In accordance with embodiments, the shape of the partial opposite flanges 851 may complement the shape of the radially interior surfaces of the rotor bars 100 and the shape of the partial opposite flanges 861 may complement the shape of the radially exterior surfaces of the rotor bars 100 such that the rotor bars 100 sit flush in the rotor bar openings 60. In accordance with further embodiments, the partial opposite flanges 851 may have a partial circular curvature and the partial opposite flanges 861 may have a similarly partial circular curvature.

The shorting ring 110 may be electrically coupled to each of the rotor bars 100 and may further serve to provide axial retention of the rotor bars 100 in the rotor bar openings 60.

The rotor bars 100 may be formed of copper or another similarly conductive material. The rotor bars 100 have a current carrying capacity in accordance with design parameters. A layer of electrical insulation may be provided to surround each individual rotor bar 100 to thereby electrically insulate that rotor bar 100 from adjacent rotor bars 100.

The electrical insulation may be formed of a high thermal conductivity composite including one or more of polymers/resins, high thermal conductivity fillers and structural reinforcement materials such as E, S or S2 glass fibers, polyester fibers, Kevlar fibers or a like reinforcement material. Fillers made of boron nitride having cubic or hexagonal crystal structure or silica may be used. In this manner, heat transfer from each of the rotor bars 100 through the insulation is improved resulting in reduction of localized hot spot temperatures within individual rotor bars 100 and increased heat removal.

The rotor bars 100 may be connected or otherwise coupled to an electrical grid for providing alternating current to the grid. That is, when the electric machine 10 is operating in the above-noted generator mode, the electric machine converts mechanical energy embodied as a rotation of the rotor 11 to electrical energy by means of electromagnetic induction. In addition, the rotor 11 may also be connected to a grid, for example, in case of a doubly fed generator.

The fluid communication between the radial vent opening 91 and the axial slots 50 and the fluid communication between the axial slots 50 with the rotor bar openings 60 via the pathways 80 means that coolant, such as air, may flow from the radial vent opening 91, through the axial slots 50 and the pathways 80 and into the rotor bar openings 60 such that the rotor bars 100 can be cooled. Since the axial slots 50 and the pathways 80 run along entire longitudinal lengths of the rotor bars 100 (except for the radial vent opening 91), the rotor bars 100 experience a cooling effect over their entire longitudinal lengths.

Figure 4:
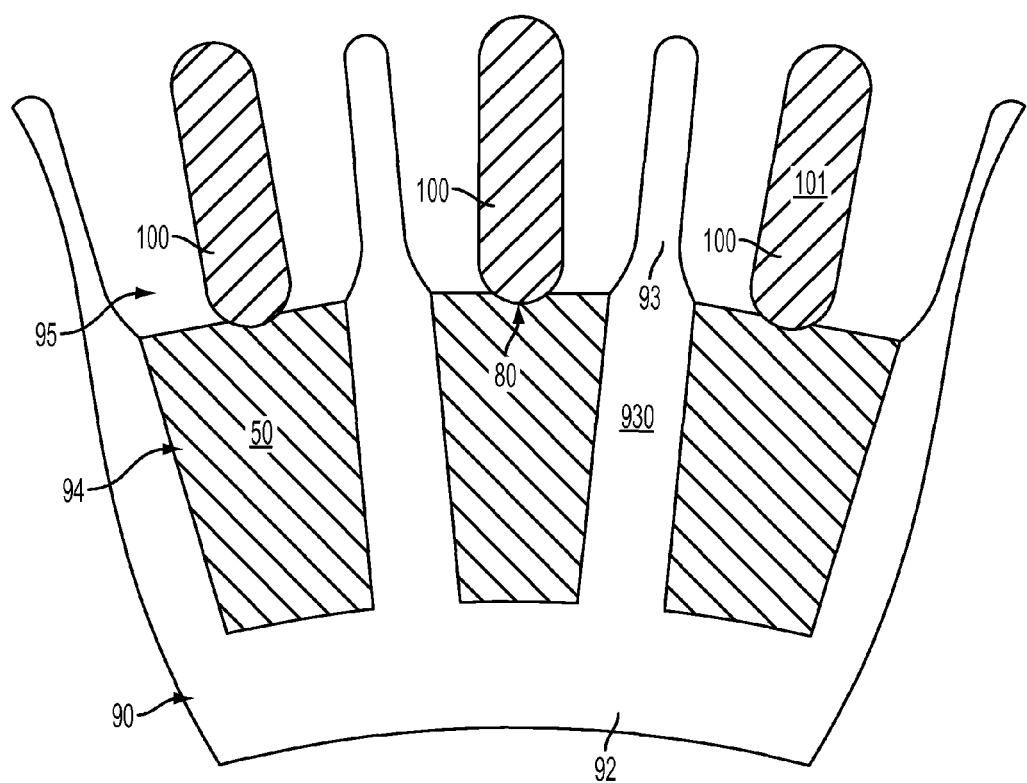
FIG. 4 is an axial view of a portion of a spacer element and rotor bars of the electric machine of FIG. 1.

As shown in FIG. 4, the spacer element 90 may be formed as a unitary or monolithic element and includes an annular or cylindrical spacer hub portion 92 and an annular array of spacer teeth 93. The spacer teeth 93 extend radially outwardly from the spacer hub portion 92 and thus define annular arrays of axial spacer slots 94 and rotor bar spacer openings 95. The spacer teeth 93 may be substantially axially aligned with the annular array of teeth 32, 42 such that the axial spacer slots 94 circumferentially align with the axial slots 50 and the rotor bar spacer openings 95 circumferentially align with the rotor bar openings 60. Each of the spacer teeth 93 may include an airfoil-shaped body 930 that has a relatively wide, nearly rectangular base proximate to the hub portion 92 and a distal portion that tapers with increasing radial distance.

Figure 5:
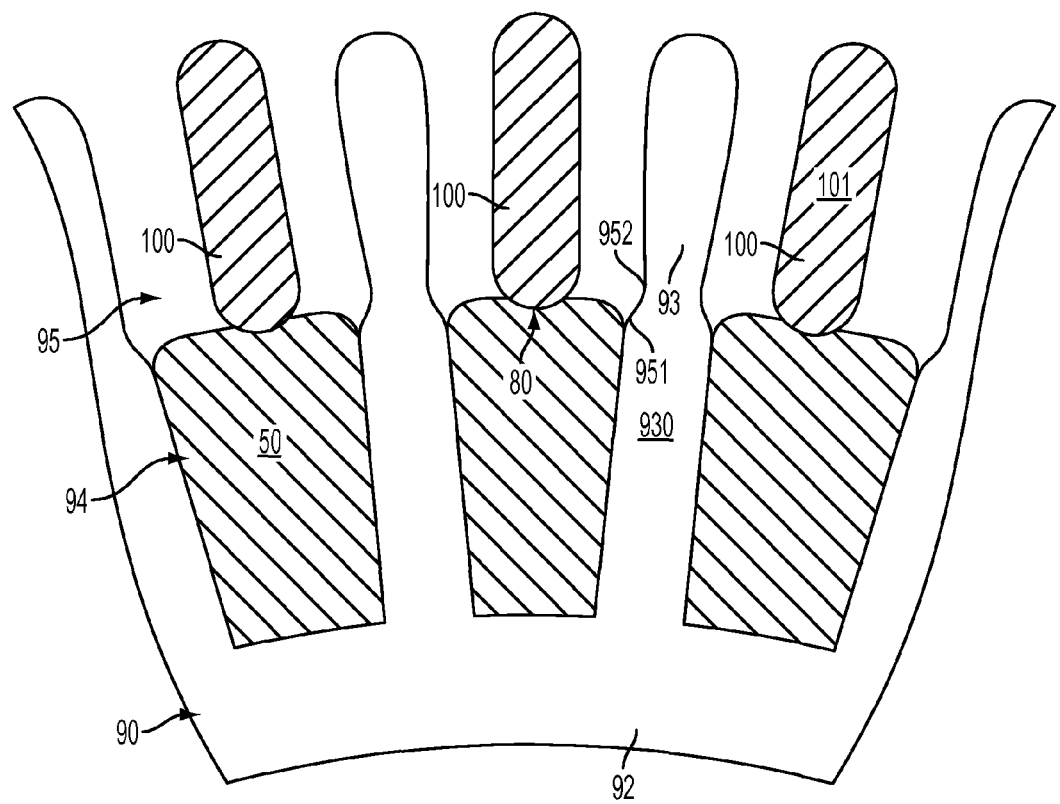
FIG. 5 is an axial view of a portion of a spacer element and rotor bars of the electric machine of FIG. 1 in accordance with further embodiments.

The tapering of FIG. 4 can be enhanced such that the rotor bar spacer openings 95 are of approximately a fixed or uniform width-wise dimension with increasing radial position from a center of rotation of the rotor 11. In accordance with further embodiments and, with reference to FIG. 5, the tapering may be enhanced for example by the presence of additional curvatures 951 and 952 on opposite sides of the spacer teeth 93. The additional curvatures 951 and 952 curve away from and then toward an exterior surface of the rotor bars 100 such that the respective shapes of the opposite sides of the spacer teeth 93 resemble the shapes of the corresponding exterior surfaces of the rotor bars 100.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A rotor of an electric machine, comprising:
    laminations bonded to form first and second core elements, each of the first and second core elements including an annular array of teeth defining annular arrays of leakage notches, axial slots and rotor bar openings,
    wherein the first and second core elements comprise outer diameter retention elements formed by partial opposite flanges defining the leakage notches such that each rotor bar opening is positioned radially between a corresponding leakage notch and an axial slot, and each rotor bar opening being configured to retain a rotor bar therein; and
    a spacer element interposed between the first and second core elements to define a rotor vent opening fluidly communicative with the axial slots and the leakage notches, the spacer element comprising an annular spacer hub portion and an annular array of spacer teeth, the annular array of spacer teeth extending radially outwardly from the spacer hub portion,
    wherein the annular array of spacer teeth is aligned with the annular array of teeth, and
    wherein each of the spacer teeth comprises an airfoil-shaped body with a distal portion that tapers with increasing radial distance from the spacer hub portion.

2. The rotor according to claim 1, wherein each of the rotor bars comprises conductive material.

3. The rotor according to claim 1, wherein each of the rotor bars comprises metallic materials.

4. The rotor according to claim 1, wherein each of the rotor bars comprises an elongate body.

5. The rotor according to claim 1, wherein the laminations are configured to form further partial opposite flanges at complementary ends of each axial slot and the corresponding one of the rotor bar openings.

6. The rotor according to claim 1, wherein the laminations are configured to form the partial opposite flanges at an exterior end of each rotor bar opening.

7. The rotor according to claim 1, wherein the airfoil-shaped body of each of the spacer teeth has a rectangular base proximate to the spacer hub portion.

8. An electric machine, comprising:
    a rotor; and
    a stator defining a bore in which the rotor is rotatably supportable,
    the rotor comprising:
        laminations bonded to form first and second core elements, each of the first and second core elements comprising an annular array of teeth defining annular arrays of leakage notches, axial slots and rotor bar openings,
        wherein the first and second core elements comprise outer diameter retention elements formed by partial opposite flanges defining the leakage notches such that each rotor bar opening is positioned radially between a corresponding leakage notch and an axial slot;
        a spacer element interposed between the first and second core elements to define a rotor vent opening fluidly communicative with the axial slots, and leakage notches, the spacer element comprising an annular spacer hub portion and an annular array of spacer teeth, the annular array of spacer teeth extending radially outwardly from the spacer hub portion; and
        an annular array of rotor bars, each rotor bar being retained in a corresponding one of the rotor bar openings,
        wherein the annular array of spacer teeth is aligned with the annular array of teeth, and
        wherein each of the spacer teeth comprises an airfoil-shaped body with a distal portion that tapers with increasing radial distance from the spacer hub portion.

9. The electric machine according to claim 8, wherein each of the rotor bars comprises conductive material.

10. The electric machine according to claim 8, wherein each of the rotor bars comprises metallic materials.

11. The electric machine according to claim 8, wherein each of the rotor bars comprises an elongate body.

12. The electric machine according to claim 8, wherein the laminations are configured to form further partial opposite flanges at complementary ends of each axial slot and the corresponding one of the rotor bar openings.

13. The electric machine according to claim 8, wherein the laminations are configured to form the partial opposite flanges at an exterior end of each rotor bar opening.

14. The electric machine according to claim 8, wherein the airfoil-shaped body of each of the spacer teeth has a rectangular base proximate to the spacer hub portion.

* * * * *